(12) United States Patent
Burton, Jr.

(10) Patent No.: US 7,682,600 B2
(45) Date of Patent: Mar. 23, 2010

(54) PROCESS FOR PREPARING MTT ZEOLITES USING N,N,N,N',N',N'-HEXAMETHYL-PROPANE-1,3-DIAMMONIUM DICATION STRUCTURE DIRECTING AGENT

(75) Inventor: Allen W. Burton, Jr., Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 450 days.

(21) Appl. No.: 11/565,812

(22) Filed: Dec. 1, 2006

(65) Prior Publication Data

US 2007/0128105 A1 Jun. 7, 2007

Related U.S. Application Data

(63) Continuation-in-part of application No. 11/216,546, filed on Aug. 30, 2005, now Pat. No. 7,157,075.

(51) Int. Cl.
*C01B 39/04* (2006.01)
(52) U.S. Cl. .................................... 423/708
(58) Field of Classification Search .................. 423/708
See application file for complete search history.

(56) References Cited

U.S. PATENT DOCUMENTS

| 4,076,842 | A | | 2/1978 | Plank et al. | |
|---|---|---|---|---|---|
| 4,537,704 | A | * | 8/1985 | Sprecker et al. | 510/106 |
| 4,568,654 | A | * | 2/1986 | Valyocsik | 502/62 |
| 4,619,820 | A | * | 10/1986 | Valyocsik | 423/708 |
| 4,632,815 | A | * | 12/1986 | Valyocsik | 423/328.2 |
| 4,665,250 | A | * | 5/1987 | Chu et al. | 585/415 |
| 4,873,067 | A | * | 10/1989 | Valyocsik et al. | 423/279 |
| 5,053,373 | A | | 10/1991 | Zones | |
| 5,332,566 | A | | 7/1994 | Moini | |
| 5,707,600 | A | | 1/1998 | Nakagawa et al. | |
| 5,707,601 | A | | 1/1998 | Nakagawa | |
| 5,785,947 | A | | 7/1998 | Zones et al. | |
| 6,548,040 | B1 | * | 4/2003 | Rouleau et al. | 423/705 |
| 6,676,923 | B1 | * | 1/2004 | Zones et al. | 423/718 |
| 2004/0005271 | A1 | * | 1/2004 | Zones et al. | 423/705 |
| 2008/0027259 | A1 | * | 1/2008 | Roth et al. | 585/475 |

* cited by examiner

*Primary Examiner*—David M Brunsman
(74) *Attorney, Agent, or Firm*—Richard J. Sheridan

(57) ABSTRACT

The present invention rebates to a process for preparing zeolites having the MTT framework topology defined by the connectivity of the tetrahedral atoms in the zeolite, such as zeolites SSZ-32 and ZSM-23, using an N,N,N,N',N',N'-hexamethyl-propane-1,3-diammonium dication as a structure directing agent.

16 Claims, No Drawings

PROCESS FOR PREPARING MTT ZEOLITES USING N,N,N,N',N',N'-HEXAMETHYL-PROPANE-1,3-DIAMMONIUM DICATION STRUCTURE DIRECTING AGENT

This application is a Continuation-In-Part of application Ser. No. 11/216,546, filed Aug. 30, 2005 now U.S. Pat. No. 7,157,075.

BACKGROUND OF THE INVENTION

1. Field of the Invention

The present invention relates to a process for preparing zeolites having the MTT framework topology defined by the connectivity of the tetrahedral atoms in the zeolite using the following structure directing agent:

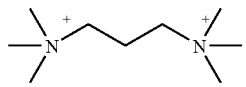

N,N,N,N'N'N'-Hexamethyl-propane-1,3-diammonium cation.

2. State of the Art

Zeolites having the MTT framework topology defined by the connectivity of the tetrahedral atoms (referred to herein simply as MTT) are known. See, for example, Ch. Baerlocher et al., *Atlas of Zeolite Framework Types*, 5$^{th}$ Revised Edition, 2001 of the International Zeolite Association. Examples of MTT zeolites include the zeolite designated "SSZ-32". SSZ-32 and methods for making it are disclosed in U.S. Pat. No. 5,053,373, issued Oct. 1, 1991 to Zones. This patent discloses the preparation of zeolite SSZ-32 using in N-lower alkyl-N'-isopropylimidazolium cation as an organic structure directing agent (SDA), sometimes called a templating agent. U.S. Pat. No. 4,076,842, issued Feb. 28, 1978 to Plank et al., discloses the preparation of the zeolite designated "ZSM-23", a zeolite with a structure similar to SSZ-32, using a cation derived from pyrrolidine as the SDA. Zeolites SSZ-32 and ZSM-23 are commonly referred to as having the MTT framework topology. Both of the aforementioned patents are incorporated herein by reference in their entirety. Other MTT zeolites include EU-13, ISI-4 and KZ-1.

U.S. Pat. No. 5,707,600, issued Jan. 13, 1998 to Nakagawa et al., discloses a process for preparing medium pore size zeolites, including SSZ-32, using small, neutral amines. The amines contain (a) only carbon, nitrogen and hydrogen atoms, (b) one primary, secondary or tertiary, but not quaternary, amino group, and (c) a tertiary nitrogen atom, at least one tertiary carbon atom, or a nitrogen atom bonded directly to at least one secondary carbon atom, wherein the process is conducted in the absence of a quaternary ammonium compound. Examples of the small amines include isobutylamine, diisobutylamine, trimethylamine, cyclopentylamine, diisopropylamine, sec-butylamine, 2,5-dimethylpyrrolidine and 2,6-dimethylpiperidine.

U.S. Pat. No. 5,707,601 issued Jan. 13, 1998 to Nakagawa, discloses a process for preparing MTT zeolites using small, neutral amines. The amines contain (a) only carbon, nitrogen and hydrogen atoms, (b) one primary, secondary, or tertiary, but not quaternary, amino group, and (c) a tertiary nitrogen atom, at least one tertiary carbon atom, or a nitrogen atom bonded directly to at least one secondary carbon atom, wherein the process is conducted in the absence of a quaternary ammonium compound. Examples of the small amines include isobutylamine, diisobutylamine, trimethylamine, cyclopentylamine, diisopropylamine, sec-butylamine, 2,5-dimethylpyrrolidine and 2,6-dimethylpiperidine.

U.S. Pat. No. 5,785,947, issued Jul. 28, 1998 to Zones et al., discloses that zeolites, including medium pore size, unidimensional zeolites, can be prepared using a mixture of an amine component comprising (1) at least one amine containing one to eight carbon atoms, ammonium hydroxide, and mixtures thereof, and (2) an organic templating compound capable of forming the zeolite in the presence of the amine component, wherein the amine is smaller than the organic templating compound. Examples of the amines include isopropylamine, isobutylamine, n-butylamine, piperidine, 4-methylpiperidine, cyclohexylamine, 1,1,3,3-tetramethylbutylamine and cyclopentylamine and mixtures of such amines.

U.S. Pat. No. 5,332,566, issued Jul. 26, 1994 to Moini, discloses a method of synthesizing ZSM-23 (i.e., MTT) using an organic directing agent having the structure:

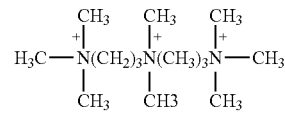

U.S. Pat. No. 6,475,464, issued Nov. 5, 2002 to Rouleau et al., discloses the preparation of MTT zeolites using alkylated polymethylene α-ω diammonium derivatives acting as a template or structure directing agent. These derivatives are defined by the formula $R_1R_2R_3N^+(CH_2)_nN^+R_4R_5R_6$, n being in the range 3 to 14 and $R_1$ to $R_6$, which may be identical or different, representing alkyl or hydroxylalkyl radicals containing 1 to 8 carbon atoms; up to five $R_1$ to $R_6$ radicals can be hydrogen. N,N,N,N',N'N'-hexamethyl-propane-1,3-diammonium dication is not specifically disclosed, nor is it used in any of the examples. It is disclosed that the MTT zeolite may be prepared using alkali metal or ammonium ion. Sodium or ammonium cations are used in the examples. It is also required that the reaction mixture contain seed crystals of a zeolite other than a MTT zeolite.

It has now been found that MTT zeolites, such as SSZ-32, can be prepared using structure directing agent N,N,N,N', N'N'-hexamethyl-propane-1,3-diammonium dication.

SUMMARY OF THE INVENTION

In accordance with the present invention, there is provided a process for preparing, MTT zeolites, said process comprising:

(a) preparing a reaction mixture comprising (1) sources of potassium oxide; (2) optionally, sources of an oxide selected from the oxides of aluminum, boron, iron, gallium, titanium, vanadium or mixtures thereof; (3) sources of silicon oxide; (4) a structure directing agent comprising a N,N,N,N',N'N'-hexamethyl-propane-1,3-diammonium dication (hereinafter also referred to as "SDA Q") and (5) water;

(b) maintaining the reaction mixture under conditions sufficient to form crystals of the zeolite; and (c) recovering the crystals of the zeolite.

In one embodiment, the present invention provides said process which is performed in the absence of any nitrogen-containing organic compound other than SDA Q. In another embodiment, the process is conducted in the absence of seed crystals of a zeolite different from MTT zeolite.

The present invention also provides MTT zeolites whose composition, as-synthesized and in the anhydrous state, in terms of mole ratios, is as follows:

| | |
|---|---|
| $YO_2/W_cO_d$ | 15-∞ |
| $Q/YO_2$ | 0.02-0.10 |
| $K/YO_2$ | 0.005-0.10 | wherein Y is silicon; W is aluminum, boron, gallium, indium, iron, titanium, vanadium or mixtures thereof; c is 1 or 2; d is 2 when c is 1 (i.e., W is tetravalent) or d is 3 or 5 when c is 2 (i.e., d is 3 when W is trivalent or 5 when W is pentavalent); and Q is

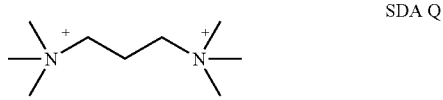

N,N,N,N'N'N'-Hexamethyl-propane-1,3-diammonium cation.

The present invention also provides a preferred embodiment of this composition wherein said composition does not contain any nitrogen-containing organic templating agent other than SDA Q.

DETAILED DESCRIPTION OF PREFERRED EMBODIMENTS

The present invention comprises:
(a) preparing a reaction mixture comprising (1) sources of potassium oxide; (2) optionally, sources of an oxide selected from the oxides of aluminum, iron, boron, gallium, indium, titanium, vanadium or mixtures thereof; (3) sources of silicon oxide: (4) the following structure directing agent:

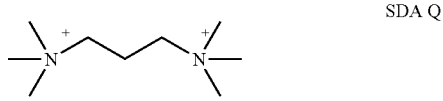

N,N,N,N'N'N'-Hexamethyl-propane-1,3-diammonium cation and (5) water;
(b) maintaining the reaction mixture under conditions sufficient to form crystals of the zeolite; and
(c) recovering the crystals of the zeolite.

The process of the present invention comprises forming a reaction mixture from sources of potassium cations; optionally, sources of an oxide of aluminum, boron, iron, gallium, indium, titanium, vanadium or mixtures thereof (W); sources of an oxide of silicon oxide (Y); SDA Q (Q); and water, said reaction mixture having a composition in terms of mole ratios within the following ranges:

TABLE A

| Reactants | General | Preferred |
|---|---|---|
| $YO_2/W_aO_b$ | 15-∞ | 30-80 |
| $OH^-/YO_2$ | 0.10-0.50 | 0.15-0.30 |
| $Q/YO_2$ | 0.05-0.50 | 0.10-0.40 |

TABLE A-continued

| Reactants | General | Preferred |
|---|---|---|
| $K/YO_2$ | 0.05-0.50 | 0.075-0.30 |
| $H_2O/YO_2$ | 10-70 | 25-50 | where Y is silicon; W is aluminum, boron, gallium, indium, iron, titanium, vanadium; a is 1 or 2, b is 2 when a is 1 (i.e., W is tetravalent); b is 3 when a is 2 (i.e., W is trivalent); and Q is SDA Q.

Embodiments of the process of this invention include reaction mixtures in which the $YO_2/W_aO_b$ mole ratio is from about 20 to about 80; from about 20 to less than 40; 40 or more; and from 40 to about 80.

Typical sources of aluminum oxide for the reaction mixture include aluminates, alumina, hydrated aluminum hydroxides, and aluminum compounds such as $AlCl_3$ and $Al_2(SO_4)_3$. Typical sources of silicon oxide include silica hydrogel, silicic acid, colloidal silica, tetraalkyl orthosilicates, silica hydroxides, and fumed silicas. Other metals can be added in forms corresponding to their aluminum and silicon counterparts. Trivalent elements stabilized on silica colloids are also useful reagents.

The SDA useful in the process of the present invention is SDA Q having the following formula:

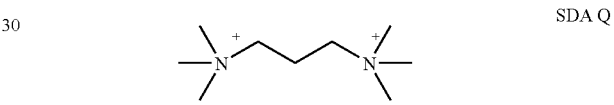

N,N,N,N'N'N'-Hexamethyl-propane-1,3-diammonium cation

In preparing MTT zeolites in accordance with the present invention, the reactants and SDA Q can be dissolved in water and the resulting reaction mixture maintained at an elevated temperature until crystals are formed. The reaction is conducted at about 150° C. It has been found that this temperature achieves good results. The crystallization period is typically 6-21 days, and generally about 7-14 days.

The hydrothermal crystallization is usually conducted under pressure and usually in an autoclave so that the reaction mixture is subject to autogenous pressure. The reaction mixture should be stirred during crystallization.

Once the crystals have formed, the solid product is separated from the reaction mixture by standard mechanical separation techniques, such as filtration. The crystals are water-washed and then dried, e.g., at 90° C. to 150° C. for from 8 to 24 hours, to obtain the as-synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with crystals of the desired MTT zeolite both to direct, and accelerate the crystallization, as well as to minimize the formation of any undesired crystalline phases. When seed crystals are used, typically about 0.5% to about 5.0% (based on the weight of silica used in the reaction mixture) of the seed crystals of the desired zeolite are added. It is not necessary to use crystals of a zeolite other than MTT zeolite. In one embodiment, the MTT zeolite is formed in the presence of potassium and SDA Q, but in the absence of seed crystals of a zeolite different from MTT zeolite.

Due to the unpredictability of the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture or to the reaction conditions, such as temperature, and/or crystallization time. Making these modifications are well within the capabilities of one skilled in the art.

The as-synthesized MTT zeolite product made by the process of this invention has an as-synthesized composition comprising, in terms of mole ratios in the anhydrous state, the following:

| | |
|---|---|
| $YO_2/W_cO_d$ | 15-∞ |
| $Q/YO_2$ | 0.02-0.10 |
| $K/YO_2$ | 0.005-0.10 | wherein Y is silicon; W is aluminum, boron, gallium, indium, iron, titanium, vanadium or mixtures thereof; c is 1 or 2; d is 2 when c is 1 or d is 3 or 5 when c is 2; Q is SDA Q. In one embodiment, Y is silicon and W is aluminum. The $YO_2/W_cO_d$ ratio may be from about 20 to about 80. In one embodiment of this invention, the $YO_2/W_cO_d$ ratio is from about 20 to less than 40, and in another embodiment this ratio is greater than 40, e.g., from 40 to about 80.

The MTT zeolites can be made with a mole ratio of $YO_2/W_cO_d$ of ∞, i.e., there is essentially no $W_cO_d$ present in the MTT zeolite. In this case, the zeolite would be an all-silica material. Thus, in a typical case where oxides of silicon and aluminum are used, the MTT zeolite can be made essentially aluminum free, i.e., having a silica to alumina mole ratio of ∞. One method of increasing the mole ratio of silica to alumina is by using standard acid leaching or chelating treatments. However, essentially aluminum-free MTT zeolites can be synthesized using essentially aluminum-free silicon sources as the main tetrahedral metal oxide component. The MTT zeolites can also be prepared directly as an aluminosilicate.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

Typically, the zeolite is thermally treated (calcined) prior to use as a catalyst.

Usually, it is desirable to remove the potassium cation by ion exchange and replace it with hydrogen, ammonium, or any desired metal ion. The zeolite can be leached with chelating agents, e.g., EDTA or dilute acid solutions, to increase the silica/alumina mole ratio. The zeolite can also be steamed; steaming helps stabilize the crystalline lattice to attack from acids. The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired. Typical replacing cations can include hydrogen and hydrogen precursors, rare earth metals, and metals from Groups IIA, IIIA, IVA, IB, IIB, IIIB, IVB, VIB, and VIII of the Periodic Table of Elements. Of the replacing cations, hydrogen and cations of metals such as rare earth, Mn, Ca, Mg, Zn, Cd, Pt, Pd, Ni, Co, Ti, Al, Sn, Ga, In and Fe are particularly preferred.

The X-ray diffraction pattern of Table I is representative of a calcined MTT zeolite (in this case SSZ-32) made in accordance with this invention. Minor variations in the diffraction pattern can result from variations in the silica-to-alumina mole ratio of the particular sample due to changes in lattice constants. In addition, sufficiently small crystals will affect the shape and intensity of peaks, leading to significant peak broadening. The variation in the scattering angle (two theta) measurements, due to instrument error and to differences between individual samples, is estimated at +/−0.10 degrees.

The X-ray powder diffraction pattern was determined by standard techniques. The radiation was the K-alpha/doublet of copper. A diffractometer with a scintillation counter detector was used. The peak heights I and the positions, as a function of 2Theta where Theta is the Bragg angle, were read from the relative intensities, $100 \times I/I_o$ where $I_o$ is the intensity of the strongest line or peak, and d, the interplanar spacing in Angstroms corresponding to the recorded lines, can be calculated.

TABLE I

CALCINED MTT ZEOLITE

| 2Theta | d | Rel I[a] |
|---|---|---|
| 7.90[b] | 11.18 | VS |
| 8.12[b] | 10.88 | VS |
| 8.86 | 9.97 | M |
| 11.38 | 7.76 | S |
| 14.60 | 6.06 | W |
| 15.86 | 5.58 | W |
| 16.32 | 5.43 | W |
| 18.12 | 4.89 | W |
| 19.72 | 4.50 | VS |
| 20.96 | 4.24 | VS |
| 22.86 | 3.89 | VS |
| 24.02 | 3.70 | VS |
| 24.62 | 3.61 | S-VS |
| 25.28 | 3.52 | M |
| 25.98 | 3.43 | S |
| 28.26 | 3.16 | W |
| 31.60 | 2.83 | W |
| 35.52 | 2.52 | S |

[a]The X-ray patterns provided are based on a relative intensity scale in which the strongest line in the X-ray pattern is assigned a value of 100: W(weak) is less than 20; M(medium) is between 20 and 40: S(strong) is between 40 and 60; VS(very strong) is greater than 60.
[b]These two peaks may have significant overlap, and are sometimes treated as a single peak.

Table IA below shows an X-ray diffraction pattern representative of a calcined MTT zeolite (SSZ-32) made in accordance with this invention. In Table IA, the intensity (I) of the peaks or lines is expressed as the intensity relative to the strongest peak or line in the pattern, i.e., $I/I_o \times 100$ where $I_o$ is the intensity of the strongest peak or line.

TABLE IA

CALCINED MTT ZEOLITE

| 2Theta | d | $I/I_o \times 100$ |
|---|---|---|
| 7.90[b] | 11.18 | 71.8 |
| 8.12[b] | 10.88 | 86.1 |
| 8.86 | 9.97 | 32.6 |
| 11.38 | 7.76 | 49.3 |
| 14.60 | 6.06 | 6.4 |
| 15.86 | 5.58 | 11.4 |
| 16.32 | 5.43 | 14.6 |
| 18.12 | 4.89 | 10.2 |
| 19.72 | 4.50 | 100.0 |
| 20.96 | 4.24 | 73.9 |

TABLE IA-continued

CALCINED MTT ZEOLITE

| 2Theta | d | I/I$_o$ × 100 |
|---|---|---|
| 22.86 | 3.89 | 92.1 |
| 24.02 | 3.70 | 92.1 |
| 24.62 | 3.61 | 65.4 |
| 25.28 | 3.52 | 35.7 |
| 25.98 | 3.43 | 46.0 |
| 28.26 | 3.16 | 13.3 |
| 31.60 | 2.83 | 16.2 |
| 35.52 | 2.52 | 50.4 |

[b]These two peaks may have significant overlap, and are sometimes treated as a single peak.

The X-ray diffraction pattern of Table II shows the major peaks of an as-synthesized MTT zeolite (in this case SSZ-32), in the anhydrous state, made in accordance with this invention.

TABLE II

AS-SYNTHESIZED MTT ZEOLITE

| 2Theta | d | Rel I |
|---|---|---|
| 8.19[c] | 10.79 | S |
| 8.95 | 9.87 | M |
| 11.42 | 7.74 | M |
| 16.41 | 5.40 | W |
| 18.20 | 4.87 | W |
| 19.76 | 4.49 | VS |
| 21.01 | 4.22 | VS |
| 22.94 | 3.87 | VS |
| 24.09 | 3.69 | VS |
| 24.70 | 3.60 | S |
| 26.05 | 3.42 | S |
| 35.57 | 2.52 | S |

[c]Quite likely two peaks overlapped.

Table IIA below shows the major peaks of a typical X-ray diffraction pattern for as-synthesized MTT zeolite made in accordance with this invention, including the relative intensities of the peaks or lines.

TABLE IIA

AS-SYNTHESIZED MTT ZEOLITE

| 2Theta | d | I/I$_o$ × 100 |
|---|---|---|
| 8.19[c] | 10.79 | 56.3 |
| 8.95 | 9.87 | 23.9 |
| 11.42 | 7.74 | 35.4 |
| 16.41 | 5.40 | 9.5 |
| 18.20 | 4.87 | 13.0 |
| 19.76 | 4.49 | 100.0 |
| 21.01 | 4.22 | 85.6 |
| 22.94 | 3.87 | 95.7 |
| 24.09 | 3.69 | 80.3 |
| 24.70 | 3.60 | 60.9 |
| 26.05 | 3.42 | 49.9 |
| 35.57 | 2.52 | 48.9 |

[c]Quite likely two peaks overlapped.

Calcination can also result in changes in the intensities of the peaks as well as minor shifts in the diffraction pattern. The zeolite produced by exchanging the metal or other cations present in the zeolite with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

The MTT zeolites prepared by the process of this invention are useful in hydrocarbon conversion reactions. Hydrocarbon conversion reactions are chemical and catalytic processes in which carbon-containing compounds are changed to different carbon-containing compounds. Examples of hydrocarbon conversion reactions include catalytic cracking, hydrocracking, dewaxing, alkylation, isomerization, olefin and aromatics formation reactions, and aromatics isomerization and disproportionation.

The following examples demonstrate, but do not limit, the present invention.

EXAMPLES

There are numerous variations on the embodiments of the present invention which are possible in light of the teachings supporting the present invention. Reheis F-2000) alumina (53-56 wt %. $Al_2O_3$ available from Reheis Chemical Co.) was used as the aluminum source and KOH was used as the potassium source. Cabosil M-5 fused silica was used as the silica source. The reaction was performed within a Blue-M convection oven on a spit rotating at 43 rpm.

The synthesis was performed as follows: 3.75 g 1N KOH aqueous solution, 0.62 g SDA Q in the iodide form, and 9.1 g deionized $H_2O$ were mixed together in a 23 mL Teflon cup. Next, 0.044 g Reheis F-2000 was added and mixed thoroughly to yield a uniform mixture. Finally, 0.90 g Cabosil M-5 was added, and the resultant gel was thoroughly homogenized by mixing with a spatula by hand. The reaction mixture had the mole ratios shown in the table below. The Teflon reactor was then capped and sealed inside a Parr autoclave. The autoclave was then placed in an oven with a rotating spit (43 rpm) and heated at 150° C. for 24 days. After the reaction was completed, the reaction mixture was removed, cooled to room temperature, and then the reactor contents were filtered under vacuum in a glass filtration funnel, and the crystals that formed were recovered using standard techniques. The resulting crystals were MTT zeolite.

| SDA | Time (days) | Temp. C. | KOH/ SiO2[a] | SDA Q/SiO2[a] | SAR[b] | Phase |
|---|---|---|---|---|---|---|
| SDA Q | 28 | 150 | 0.25 | 0.20 | SAR = 66 | MTT |

[a]Mole ratios
[b]SAR = silica/alumina mole ratio

What is claimed is:

1. A process for preparing a zeolite having the MTT framework topology defined by the connectivity of the tetrahedral atoms in the zeolite, said process comprising: (a) preparing a reaction mixture comprising (1) sources of potassium oxide; (2) optionally, sources of an oxide selected from the oxides of aluminum, boron, iron, gallium, titanium, vanadium or mixtures thereof (3) sources of silicon oxide; (4) a structure directing agent comprising a N,N,N,N',N'N'-hexamethyl-propane-1,3-diammonium dication (hereinafter also referred to as "SDA Q") and (5) water; (b) maintaining the reaction mixture under conditions sufficient to form crystals of the zeolite; and (c) recovering the crystals of the zeolite.

2. The process of claim 1 wherein said reaction mixture comprises, in terms of mole ratios, the following:

| | |
|---|---|
| $YO_2/W_aO_b$ | 15~∞ |
| $OH^-/YO_2$ | 0.10-0.50 |
| $Q/YO_2$ | 0.05-0.50 |
| $K/YO_2$ | 0.05-0.50 |
| $H_2O/YO_2$ | 10-70 | where Y is silicon; W is aluminum, boron, gallium, indium, iron, titanium, vanadium; a is 1 or 2, b is 2 when a is 1; b is 3 when a is 2; and Q is

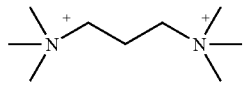

N,N,N,N'N'N'-Hexamethyl-propane-1,3-diammonium cation.

3. The process of claim 2 wherein said aqueous solution comprises, in terms of mole ratios, the following:

| | |
|---|---|
| $YO_2/W_aO_b$ | 30-80 |
| $OH^-/YO_2$ | 0.15-0.30 |
| $Q/YO_2$ | 0.10-0.40 |
| $M_{2/n}/YO_2$ | 0.075-0.30 |
| $H_2O/YO_2$ | 25-50. |

4. The process of claim 2 wherein Y is silicon and W is aluminum.

5. The process of claim 2 wherein the $YO_2/W_aO_b$ mole ratio is from about 20 to about 80.

6. The process of claim 2 wherein the $YO_2/W_aO_b$ mole ratio is from about 20 to less than 40.

7. The process of claim 2 wherein the $YO_2/W_aO_b$ mole ratio is 40 or more.

8. The process of claim 2 wherein the $YO_2/W_aO_b$ mole ratio is from about 40 to about 80.

9. The process of claim 1 further comprising replacing the potassium cations of the recovered zeolite, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

10. The process of claim 9 wherein said replacing cation is hydrogen or a hydrogen precursor.

11. A zeolite having the MTT framework topology defined by the connectivity of the tetrahedral atoms in the zeolite and having a composition, as-synthesized and in the anhydrous state, in terms of mole ratios, as follows:

| | |
|---|---|
| $YO_2/W_cO_d$ | 15~∞ |
| $Q/YO_2$ | 0.02-0.10 |
| $K/YO_2$ | 0.005-0.10 | wherein Y is silicon; W is aluminum, boron, gallium, indium, iron titanium, vanadium or mixtures thereof; c is 1 or 2; d is 2 when c is 1 or d is 3 or 5 when c is 2; and Q is

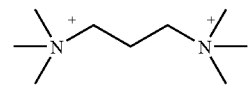

N, N, N,N'N'N'-Hexamethyl-propane-1,3-diammonium cation.

12. The zeolite of claim 11 wherein Y is silicon and W is aluminum.

13. The zeolite of claim 11 wherein the $YO_2/W_cO_d$ mole ratio is from about 20 to about 80.

14. The zeolite of claim 11 wherein the $YO_2/W_cO_d$ mole ratio is from about 20 to less than 40.

15. The zeolite of claim 11 wherein the $YO_2/W_cO_d$ mole ratio is 40 or more.

16. The zeolite of claim 11 wherein the $YO_2/W_cO_d$ mole ratio is from about 40 to about 80.

* * * * *